J. G. BUCHANAN & J. W. KELKER.
TRAIN BRAKE.
APPLICATION FILED DEC. 7, 1910.

1,030,565.

Patented June 25, 1912.

2 SHEETS—SHEET 2.

Witnesses.

Inventors.
James G. Buchanan
and John W. Kelker.
By Hazard Strauss
Attys.

UNITED STATES PATENT OFFICE.

JAMES G. BUCHANAN, OF CANANEA, MEXICO, AND JOHN W. KELKER, OF LOS ANGELES, CALIFORNIA.

TRAIN-BRAKE.

1,030,565.   Specification of Letters Patent.   Patented June 25, 1912.

Application filed December 7, 1910. Serial No. 595,999.

*To all whom it may concern:*

Be it known that we, JAMES G. BUCHANAN, citizen of the United States, residing at Cananea, Sonoro, Mexico, and JOHN W. KELKER, residing at Los Angeles, county of Los Angeles, and State of California, have invented new and useful Improvements in Train-Brakes, of which the following is a specification.

This invention relates to train brakes and particularly to air brakes.

The invention is applicable to an air brake system in which air reservoirs are provided under the cars and which under ordinary service applications furnish the air which flows into the brake cylinders to apply the brakes.

The object of this invention is to provide a construction and arrangement of valves under the cars which control the air in such a way as to permit the use of air directly from the main reservoir, that is, what is known as "straight air" may be used to apply the brakes on ordinary service applications.

Our invention enables the brakes to be applied either by employing the auxiliary air in the reservoirs, or air direct from the train pipe. Arrangement is made for an emergency application of the brakes when desired.

Figure 1:
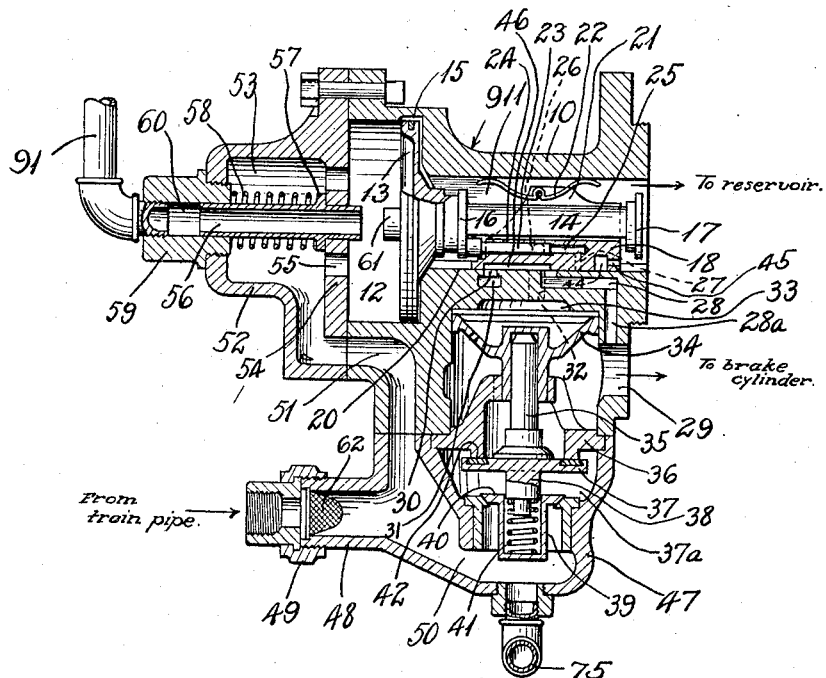
Figure 2:
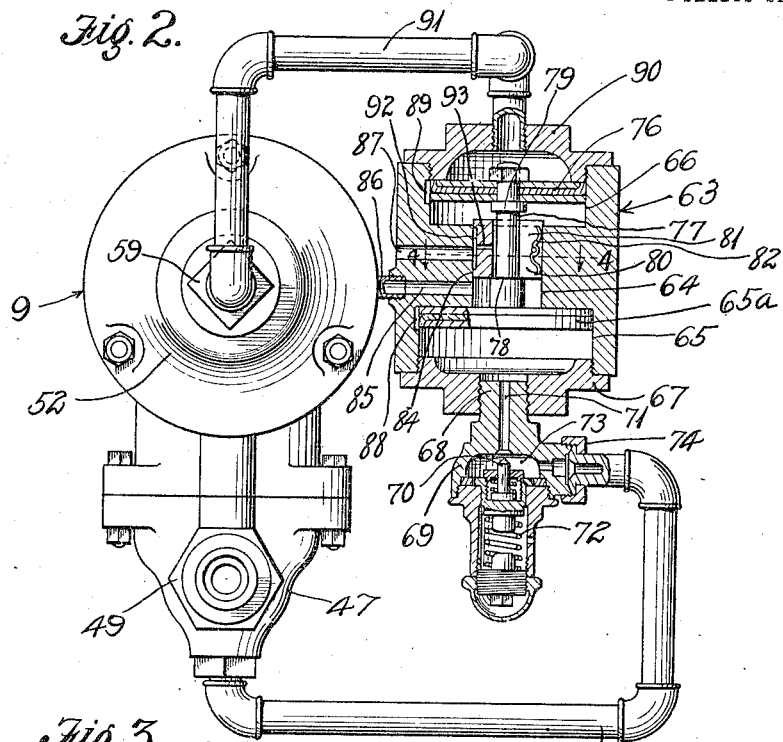
Figure 3:
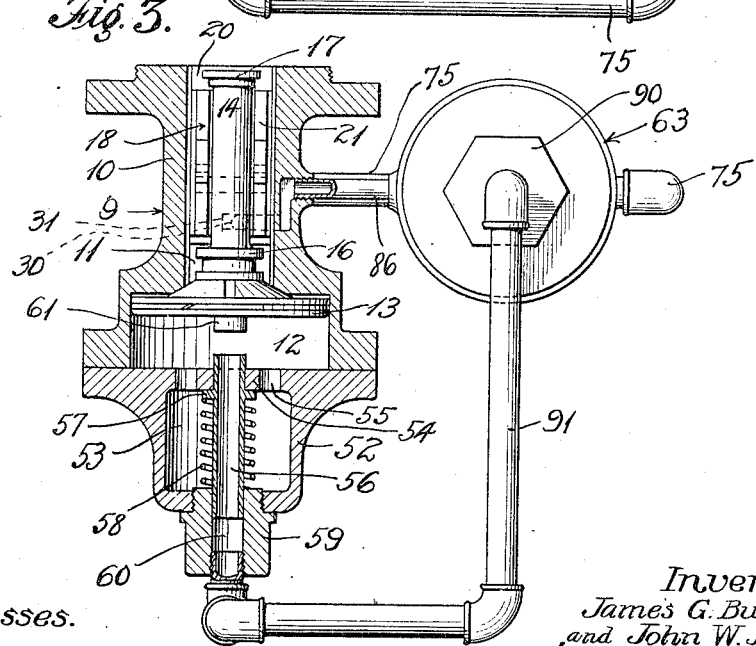

In the drawing forming a part of the annexed specification, Figure 1 is a longitudinal section through the cylinder of the triple valve and the contiguous parts of a brake system to which our invention has been applied. Fig. 2 is an end elevation of the parts shown in Fig. 1 and showing a vertical longitudinal section through an auxiliary valve which constitutes a feature of our invention, and which is connected with the triple valve as indicated. Fig. 3 is a longitudinal horizontal section through the cylinder of the triple valve and its contiguous parts, the auxiliary valve being shown in elevation. Fig. 4 is a cross section taken through the auxiliary valve and its contiguous parts. Fig. 5 is a bottom plan of the slide valve of the auxiliary valve mechanism which contains the ports for controlling the flow of air. Fig. 6 is a cross section through the slide valve of the triple valve mechanism. Fig. 7 is a horizontal longitudinal section taken through the triple valve chamber and indicating the port arrangement in the valve seat. Fig. 8 is a diagrammatic plan of the valve block and indicating the arrangement of the ports in its lower face which coöperates with the ports shown in Fig. 7.

Referring more particularly to the parts, 9 represents the triple valve which comprises a cylindrical casing 10 having a valve chamber 11 formed therein, and at one end the casing 10 is formed with an enlarged bore or cylinder 12 in which a piston head 13 is provided, said piston head having a piston rod 14 extending therefrom and lying in the valve chamber 11. In the wall of the cylinder 12 a by-pass port 15 is formed which opens communication from the interior of the cylinder to the interior of the valve chamber 11 when the piston 13 is in its release position as shown in Fig. 1, if however the piston moves toward the left this port 15 will be closed by the piston.

The piston rod 14 is formed with an inner collar 16 and an outer collar 17 and between these collars a valve shoe or block 18 is provided. The construction of this valve shoe is shown in Fig. 1 and Fig. 6. It presents a flat face 19 which rests against the valve seat 20 which is formed in the valve chamber 11. It is formed with upwardly projecting side flanges 21 which are disposed on opposite sides of the piston rod 14 as shown, and in the upper edges of this flange a leaf spring 22 is attached which thrusts against the wall of the valve chamber and holds the valve shoe firmly on its seat as will be readily understood. From the collar 16 a graduating stem 23 extends longitudinally of the piston rod and this stem is received in a longitudinal bore 24 formed in the valve block 18. Beyond the bore 24 a duct 25 of reduced diameter is formed and through the side of the bore 24 a graduating port 26 is formed which is adapted to admit air at the side from the valve chamber 11 into the bore or duct. From the duct 25 an inclined port 27 extends downwardly and emerges on the bottom of the valve, as shown in Fig. 6.

In the seat 20 there is provided an admission port 28 which connects with a passage leading to an outlet 29, which outlet is connected to the brake cylinder under the car and near the triple valve 9. In the seat 20 there is also provided an exhaust port 30 which connects with an exhaust passage 31 extending transversely under the seat of the valve as shown in Fig. 7. In addition to this there is formed in the valve seat 20 an emergency port 32, and this emergency port extends downwardly through the seat and passes into the upper end of an emergency cylinder 33. In this emergency cylinder there is provided an emergency piston 34 having a rod 35 which extends downwardly through a suitable guide head 36, said guide head forming a seat for a valve 37 which is adapted to seat by an upward movement. This valve 37 is an emergency valve and is formed on its under side with a short stem 38 which is guided downwardly in the bore 39 of a check valve 40 which is adapted to open upwardly. This bore 39 forms a chamber to receive a spring 41 which thrusts upwardly and tends to hold the valve 40 on its seat and the valve 37 on its seat. The valve 37 is provided on its upper face with a packing ring 42 which insures an air tight seating of the valve.

In the valve block 18 an emergency port 43 is provided which extends in from the side of the valve as indicated in Fig. 6 and in addition to this another emergency port 44 is provided in the under side of the valve which is provided with a horizontal port 45 extending to the end face of the valve block and adapted to admit air to the port 44 from the valve chamber 11. At the under side of the valve block 18 there is also formed an elongated inclined passage 46 which is adapted to open communication between the ports 28 and 30. The emergency valve is provided with a bonnet 47 having an inlet neck 48 to which a coupling 49 from the train pipe is attached. In this bonnet an air chamber 50 is formed which admits the air under the check valve 40 and with this air chamber connects a duct 51 which is formed in the casing 9 so as to conduct the air from the train pipe up into the bonnet 52, which covers the end of the triple valve and closes the air cylinder 12. This bonnet 52 is formed with an air chamber 53 and an inner head 54 having openings 55 through which air may pass into the cylinder 12. Mounted to slide in the inner head 54 we provide a tubular stem 56 having an integral collar 57 which seats against the outer side of the inner head 54, and a spring 58 is disposed around this stem and thrusts against the collar so that it tends to hold the tube in its extreme innermost position. The outer end of the spring 58 thrusts against the cap nut 59 which screws into the outer end of the bonnet and this cap nut is formed with a bore 60 which guides the outer end of the tubular stem as shown in Fig. 1.

On the outer face of the head 13 a button 61 is formed which is adapted to strike against the stem 56 and normally limits the movement of the piston head in an ordinary service application of the brakes, from the auxiliary reservoir.

At the coupling nut 49 a gauze cup 62 is provided through which the air must pass from the train pipe before it enters the air chamber 40.

As shown in Fig. 1 the right hand end of the valve chamber 11 is open, and it should be understood that this open end is connected with the auxiliary reservoir under the car.

Referring now especially to Figs. 2 and 3 at the sides of the triple valve we provide an auxiliary valve 63 which is of cylindrical form with the axis of the cylinder disposed in a vertical position. This valve has a reduced bore 64 at its middle portion, and an enlarged bore or cylinder 65 at its lower end. Its upper end is formed with a cylinder 66 of smaller diameter than the cylinder 65. The bore 65 is closed by screw head 67 in which there is attached a nipple 68 of a pop valve 69. This pop valve is of any suitable construction having a stem 70 normally held in the end of a port 71 which extends through the nipple. A spring 72 is provided which normally holds the stem 70 upon its seat and around the upper end of the stem an air space 73 is formed into which air may be admitted through a suitable coupling nipple 74. This coupling nipple is connected by pipe 75 to the air chamber 50 directly under the check valve 40. From this arrangement the pressure existing in the air chamber 50 is immediately communicated to the air chamber 73 of the pop valve and if the pressure is sufficient it will open the pop valve, and will force the stem 70 downwardly so as to permit the air to flow up the port 71 into the cylinder 65. In the cylinder 65 a piston head 65$^a$ is placed, and a similar piston head 76 is placed in the cylinder 66, the said piston heads being connected rigidly together by a piston rod 77. This piston rod is formed with shoulders 78 and 79 and between these shoulders there is disposed a valve shoe or block 80. The construction of this shoe is shown in Fig. 4. It has two parallel side flanges 81 and between these flanges a leaf spring 82 is attached which presses against the wall of the bore 64 and holds the curved inner face 83 of the valve shoe upon its seat 84. This seat is disposed on the side toward the triple valve 9 and is provided with a port 85 which is connected by a nipple 86 with the aforesaid exhaust passage 31 as indicated most clearly in Fig. 3. In addition to the port 85 the seat 84 is provided with an exhaust port 87 which passes from the valve seat to the atmosphere. In the wall of the cylinder 65 a longitudinally disposed duct or port 88 is formed near the inner or upper end of the cylinder, and a similar port 89 is formed at a corresponding point in the cylinder 66. The upper end of the cylinder 66 is provided with a screw cap or screw head 90 and to this head a pipe 91 is connected which leads to the cap 54 to which it is attached at the bore 60 as shown. It should be understood that the train pipe pressure normally is maintained in the air chamber 50 and in the triple cylinder 12 so that this pipe connection 91 has the effect of bringing brake pipe pressure to the upper side of the piston 76. On the face 83 of the shoe 80 there is provided an elongated passage 92 which may connect the ports 85 and 87 so as to enable the air to pass out from the exhaust port 30 to the atmosphere in this way. This passage 92 is provided with a small port or vent 93 which passes through the shoe and connects with the space between the piston heads 65$^a$ and 76. This is for the purpose of enabling the air between the piston heads to escape to the atmosphere when the auxiliary valve is in the position shown in Fig. 2. Attention is called to the fact that the shoulders 78 and 79 are a greater distance apart than the length of the shoe 80 so that the stroke of the shoe is slightly less than the stroke of the piston rod 77.

It should be understood that all of the mechanism described is placed under each car of the train and under each car there is a brake cylinder and an air reservoir.

The mode of operation of the mechanism in applying the brakes by means of the air in the auxiliary reservoirs will now be described, and this application of the brakes we call the automatic service application to distinguish it from the service application in which the air is taken directly from the train pipe into the brake cylinder. In making an automatic service application of the brakes the brake pipe pressure should be slightly reduced, and when this reduction occurs, the triple piston rod 14 moves toward the left until the button 61 touches the graduating stem 56 which will arrest the movement of the triple piston. This will close the port 15 so that there is no communication between the left end of the cylinder 12 and the right end, such communication being cut off by the piston head 13. When the piston rod 14 is moved toward the left in this manner the shoe 18 is also moved toward the left and the port 27 is brought into communication with the port 28 allowing air to pass through the ports 26, 25, 27 and 28 into the brake cylinder. In this connection it should be understood that the forward movement of the piston head 13 draws out the graduating pin or valve 23 and uncovers the port 26 in the side of the shoe 18. When the pressure in the auxiliary reservoir becomes reduced to a predetermined point the train pipe pressure on the piston head 13 forces the head part way back toward the right and until the graduating pin or valve 23 closes the port 26 and cuts off any further flow of air from the reservoir under the car to the brake cylinder.

In order to release the brakes after an automatic service application as described above the engineer should increase the pressure in the train pipe which causes the triple piston rod 14 to move toward the right to carry the shoe 18 to the position shown in Fig. 1. This will enable the passage 46 to connect ports 28 and 30. This increase in pressure in the train pipe is not sufficient to unseat the pop valve 69 and the piston 77 of the auxiliary valve is therefore in its depressed or normal position. In this depressed position the port 86 of the auxiliary valve connects the ports 85 and 87 so that the air coming through the port 30 passes out into the atmosphere. This releases the air from the brake cylinders, said air passing back through the port 28 and the passage 46 as will be readily understood.

In order to make the "straight air" service application of the brakes, that is, in order to apply the brakes by means of air taken directly from the train pipe and not from the auxiliary reservoir under the car, the pressure in the train pipe should be raised about five pounds and this has the effect of unseating the pin valve or pop valve 69 so that air flows up from the pipe connection 75 to the cylinder 65. On account of the large area of the piston 65$^a$ this pressure overcomes the train pipe pressure on the upper piston 76 and forces the piston of the auxiliary valve upwardly carrying with it the valve shoe 80. This raises the valve shoe to approximately the position shown in Fig. 2 so that connection between the ports 85 and 87 is cut off; the increasing of the pressure five pounds as described also exerts pressure on the piston head 13 for holding it at the right end of its stroke, and keeping the valve shoe or block 18 in the position shown in Fig. 1. Air then flows from the chamber 53 through pipe 91 port 89, port 85 and then through ports 31, 30 and 46 to brake cylinder. In other words by admitting the straight air or air directly from the train pipe to the auxiliary valve, the auxiliary valve is thrown into a position which permits the air to pass through it and through the triple valve into the brake cylinder. On account of the fact that the piston head 13 is moved to its extreme position toward the right in this application of the brakes, a quantity of air flows through the port 15 and through the valve chamber 11 to the reservoir under the car and in this way the application of the brakes by the air in the train pipe also recharges the air reservoirs under the car. When the desired pressure in the train pipes has been obtained the engineer moves his valve so as to cut off the flow of air to the train pipe. When the excess of air pressure which has been used in raising the pop valves 96 and filling the brake cylinders with braking pressure, has been used up, the pop valves will seat again. The flow of air from the train pipe into the brake cylinders, which were previously empty, will reduce the pressure in the cylinder 12 to such an extent that the pressure in the auxiliary reservoir will soon slightly exceed that in the train pipe and at least to a sufficient degree to move the triple valve piston 13 out and to the left so as to carry the valve 18 a sufficient distance to close the port 28 thus checking any passage of air to or from the brake cylinders. At the same time also the air in cylinder 65 has been equalizing with the air in cylinder 66, the air from which latter cylinder has been escaping through the small port 93 to the atmosphere. The air thus escaping from cylinder 65 through port 88 and from cylinder 66 through port 93, soon reduces the pressure below the pistons 65$^a$ and 76 so that the train pipe pressure above the upper cylinder 76 entering through the pipe 91, will move the pistons to the lower extremities of their movement and carry the valve 84 to its normal position for establishing communication between the port 85 and the exhaust port 88 to the atmosphere. Since the valve 18 has however been moved outwardly to the left by the slightly greater pressure in the auxiliary reservoir, the triple valve will check the exhaust through the outlet which has been opened at port 87 as just described. In order to release the pressure thus placed in the brake cylinders, the pressure in the brake pipe must be again slightly increased so as to move the valve 13 to the right. In this connection attention should be drawn to the fact that the increased pressure in the train pipe after lifting the pop valves and also the pistons 65$^a$ and 76, will cause air to rapidly pass through the port 89 and the port 85 through the valve mechanism into the empty brake cylinders. The fact that the said cylinders are empty at this time causes the air to rush therein as readily as it would escape into the atmosphere. The pressure of the air will also strive to pass through the port 15 around the piston 13 but since the auxiliary reservoirs are already charged with air, only a small portion of air will thus force its way into said cylinders. The result of this arrangement however is beneficial since it tends to completely recharge the auxiliary reservoirs at the same time that the straight air pressure is being applied to the brakes in the brake cylinders.

To release the service application of straight air as described above the engineer should move the handle of the brake valve to full release position and quickly back to running position. This increases the pressure momentarily in cylinder 12 and pushes piston 13 over toward the right carrying with it valve block 18 so as to open connection between port 28 and port 30 through the passage 46. This releases the air from the brakes because the port 30 is in communication with the passage 31 and the ports 85 and 87 permit the air to flow out to the atmosphere.

To graduate the brakes off the engineer moves the handle of his brake valve to full release and quickly back to running position as in releasing the brakes, but when the brake cylinder pressure has been reduced the desired amount the engineer then makes a small reduction in his train pipe pressure sufficient to let the triple piston rod 14 move toward the left so as to find lap and close the port 28. This will prevent any more air passing from the brake cylinders. This operation can be repeated as often as desired so as to gradually reduce the pressure in the brake cylinder.

To apply the brake as an automatic emergency brake the pressure in the brake pipe is reduced sufficiently to enable the pressure in the auxiliary reservoir to force the triple piston 13 to an extreme position to the left, the button 61 striking the stem 56 and compressing the spring 58. This moves the valve block 18 to an extreme position at the left so that the port 43 connects with the port 32 and admits air from the auxiliary reservoir into the emergency cylinder 33. In addition to this the port 44 comes over the port 28 and allows the air from the auxiliary reservoir to flow directly to the brake cylinder. When the air flows through the port 32 to the emergency cylinder 33 it forces down the piston 34 and unseats the emergency valve 37. This reduces the pressure in the closed air chamber 37$^a$ and the pressure in the chamber 50 then raises the check valve 40 and air flows upwardly direct from the train pipe past the check valve 40 and the emergency valve 37 and into the brake cylinder. In this way straight air and auxiliary reservoir air both flow into the brake cylinder. The air continues to flow until there is an equalization of pressure between the auxiliary reservoir and the brake cylinder and the check valve 40 will soon close by its spring 41. The brakes when set in this manner will be released in the same manner as with the ordinary service application.

In order to make an emergency application of straight air, the brake valve handle is held in full release position, and a great pressure will be developed and retained in the brake cylinder, or as great a pressure as the safety valve on the brake cylinder will permit.

It will be seen that brake valves constructed and arranged as described do not interfere in any way with the automatic application of the brakes in using the air from the auxiliary reservoirs. At any time, however, the engineer can set the brakes and hold standard pressure from the engine with the auxiliary reservoirs. The present invention affords means whereby an equal pressure in all the brake cylinders can be maintained regardless of the piston travel, because the pressure in the train pipe is increased enough to open pop valve 69 on all the cars when the straight air application is made and opens connection to brake cylinders through port 89 from the train pipe causing a uniform reduction throughout the length of the train. This reduces the tendency for the train to part or break in two, due to inequality in braking action of the different cars.

One of the advantages of this mechanism is that it is impossible to lose the braking power on steep grades because the auxiliary reservoirs may be very effectively recharged to full train pipe pressure when the brakes are being set or released, for it will be seen that any increase in pressure of the air in the cylinders 12 moves the piston head 13 over and opens the port 15 so that the air passes to the auxiliary reservoir.

What we claim is:—

1. A pneumatic brake mechanism, comprising means for directing the flow of air from the train pipe to the brake cylinder through the usual brake controlling valve mechanism, means for controlling the flow of air to said brake cylinders, means for directing some of the air into the auxiliary reservoirs, the reduction of pressure in the train pipe due to filling the brake cylinders and charging the auxiliary reservoirs, producing sufficient excess of pressure in the auxiliary reservoirs to catch and hold the air pressure in the brake cylinders until it is desired to release the same.

2. In a brake mechanism, the combination of a main valve controlled by air pressure, an auxiliary valve operable by an increasing pressure, a piston valve controlled in accordance with the action of the auxiliary valve for directing the pressure through a different channel and directly to the braking cylinder of the brake mechanism.

3. A brake mechanism comprising a main valve, controlled by the relative pressures in the train pipe and the auxiliary reservoir of the braking mechanism, a pressure controlled auxiliary valve actuated by difference in pressure upon each side thereof for directing the air pressure immediately to the brake cylinder, and a spring actuated valve operable by an increased pressure for admitting the pressure to one side of said auxiliary valve.

4. A brake mechanism, comprising a triple valve adapted to control the admission of pressure from an auxiliary cylinder to the brake cylinder in the braking system, a reciprocating piston valve adapted to direct the train pipe pressure into the braking cylinder without the action of the triple valve, and a spring actuated valve operable only by an excess pressure in the train pipe, for causing the movement of said piston valve when direct air pressure from the train pipe is to be admitted to the braking cylinder.

5. A brake mechanism comprising in combination with a triple valve, auxiliary reservoir and braking cylinder, of an auxiliary valve controlling the exhaust port from the valve mechanism and also operable for directing the air pressure to the brake cylinder without the operation of the triple valve, and a pop valve adapted to be operated for admitting pressure to the said auxiliary valve for causing the air pressure to pass directly to the braking cylinder.

6. A brake mechanism comprising a main valve for controlling the flow of air from an auxiliary reservoir to a brake cylinder, said valve having an exhaust port, an auxiliary piston valve adapted to control said exhaust port, said piston valve having a larger area exposed to air pressure at one end than at the other, and a spring actuated valve for controlling the admission of additional pressure to the piston valve at the end having the largest area whereby the exhaust outlet is closed and the air pressure directly admitted to the braking cylinder for applying the brakes.

7. A brake mechanism comprising a main valve for controlling the passage of air to and from the auxiliary reservoir, an auxiliary valve operable by the relative air pressures admitted to its opposite ends, the said auxiliary valve being adapted to direct train pipe pressure into a braking cylinder without the operation of the said main valve, and a spring controlled valve for causing the change in pressure upon the auxiliary valve in accomplishing the operation thereof.

8. In brake mechanism, in combination, a main valve controlling the flow of air from the train pipe to the auxiliary reservoir, an auxiliary valve, said auxiliary valve and said main valve having ports adapted to coöperate to permit the flow of air from said auxiliary valve through said main valve directly to the brake cylinder, and a pop valve in connection with said auxiliary valve and adapted to be opened by change of pressure.

9. In a brake mechanism, in combination, a main valve, controlling the flow from the train pipe to the auxiliary reservoir, and having an exhaust port, an auxiliary valve connected with said exhaust port and normally holding communication to the atmosphere closed, said auxiliary valve having a piston for controlling the same, said piston having heads of unequal diameter, and means for admitting air to both of said heads to control said auxiliary valve.

10. In brake mechanism, in combination, a main valve, controlling the flow from the train pipe to the auxiliary reservoir and having an exhaust port, normally opening communication to the atmosphere, said auxiliary valve having piston heads of unequal diameter, pneumatically actuated means for controlling the flow of air to the piston head of large diameter to actuate said auxiliary valve to close off communication to the atmosphere, and means for holding said main valve simultaneously in a position to permit the passage of air from said auxiliary valve through said main valve directly to the brake cylinder.

11. In a brake mechanism, in combination, a main valve controlling the flow from the train pipe to the auxiliary reservoir, and controlling the flow from the auxiliary reservoir to the brake cylinder, an auxiliary valve controlling the flow from the train pipe directly to the brake cylinder, said valves having coöperating ports, said auxiliary valve normally opening communication to the atmosphere from said main valve, a pop valve in connection with said auxiliary valve for controlling the same, means for admitting train pipe pressure to said pop valve, said auxiliary valve having a piston for actuating the same, and means for admitting air from the train pipe constantly on one side of said piston, said piston having an enlarged head adapted to be moved by train pipe air when said pop valve is actuated.

In witness that we claim the foregoing we have hereunto subscribed our names this 19th and 30th days of November, 1910.

JAMES G. BUCHANAN.
JOHN W. KELKER.

Witnesses as to Buchanan:
J. W. BRUCE,
I. MACMANUS.

Witnesses as to Kelker:
EDMUND A. STRAUSE,
CASSELL SEVERANCE.

Copies of this patent may be obtained for five cents each, by addressing the "Commissioner of Patents, Washington, D. C."